United States Patent [19]

Andersen

[11] 4,142,824

[45] Mar. 6, 1979

[54] TIP COOLING FOR TURBINE BLADES

[75] Inventor: Richard H. Andersen, Cincinnati, Ohio

[73] Assignee: General Electric Company, Cincinnati, Ohio

[21] Appl. No.: 830,267

[22] Filed: Sep. 2, 1977

[51] Int. Cl.[2] .......................... F01D 5/18; F02C 7/18

[52] U.S. Cl. .................................. 415/115; 416/97 R

[58] Field of Search ........................ 415/115, 116, 117; 416/95, 96 R, 96 A, 97 R

[56] References Cited

U.S. PATENT DOCUMENTS

| | | | |
|---|---|---|---|
| 3,533,712 | 10/1970 | Kercher | 415/116 |
| 3,628,885 | 12/1971 | Sidenstick et al. | 416/95 |
| 3,810,711 | 5/1974 | Emmerson et al. | 416/97 |
| 4,040,767 | 8/1977 | Dierberger et al. | 415/115 |

*Primary Examiner*—Louis J. Casaregola

*Attorney, Agent, or Firm*—Robert C. Lampe, Jr.; Derek P. Lawrence

[57] ABSTRACT

A turbomachinery rotor blade includes an internal coolant cavity between a pair of radially extending side walls which combine to form an airfoil having an open end between the radial extremities of the side walls. A tip cap recessed within the open end partially seals the internal coolant cavity from the blade environment. The radial extremities of the side walls extending beyond the tip cap into proximity with a circumscribing shroud form a labyrinth seal for inhibiting leakage of the operating gas across the blade tip. A portion of the cooling air is routed from the internal coolant cavity, around the tip cap and through a multiplicity of generally radial channels formed within the radial extremities of the side walls to provide cooling thereof, and is thereafter discharged out of the open end of each channel at the tip of the side walls.

6 Claims, 6 Drawing Figures

TIP COOLING FOR TURBINE BLADES

BACKGROUND OF THE INVENTION

This invention relates to cooling systems and, more particularly, to cooling the tip perimeter of a turbomachinery rotor blade.

Turbomachinery rotor blades of certain varieties operate in extremely high temperature environments. In order to maintain the blades in operable condition, means are provided for routing cooling fluid (usually air) to the blades for reducing the high surface temperatures. One area which is particularly troublesome in this regard is the blade tip, the radial extremity of the blade.

One characteristic of the blade tip which makes it difficult to cool is the fact that it is disposed in proximity with a circumscribing shroud. The shroud serves to define a flow path for the operating fluid of the turbomachine, and the proximity between the shroud and the blade tip is the result of attempts to improve engine efficiency by minimizing leakage of operating fluid past the blade tips. In order to cool the blade tip a recessed cap has been provided in the prior art which combines with the side walls and shroud to form a tip space within which cooling air is passed from a blade internal cavity.

In addition to defining a cavity for cooling the tip area, the radial extremities of the side walls tend to form a labyrinth seal for inhibiting the leakage of the operating fluid (often in excess of 2000° F.) between the blade tip and the shroud from the blade airfoil pressure surface to the suction surface, leakage which reduces the aerodynamic efficiency of the turbine. It is well understood that maximum engine efficiency requires minimum cooling air usage which, in turn, demands that cooling air application be as efficient as possible. In furtherance of this aim and as previously mentioned, the tip space of the prior art is generally cooled by cooling air passed from an internal blade cavity to the tip space by means of at least one aperture in the cap. However, as the temperature of the working fluid steadily increases in advanced technology turbomachinery, the extreme tip of the blade, comprising the radial extremities of the side walls extending beyond the tip cap, is extremely difficult to cool due, in part, to the need for a generous allowance of rub material in the event that the rotating blade contacts the proximate circumscribing stationary shroud. In other words, the tip cap is recessed to remove it from close proximity with the circumscribing shroud to avoid rubbing contact therebetween. This requires a clearance gap of from approximately 0.1 to 0.15 inch. Thus, the difficulty in cooling. Cooling of these extremities could be accomplished in the manner of the prior art by dumping larger amounts of air into the tip space, but the amount of air required to provide effective cooling thereof would be undesirable from a performance cycle standpoint. Furthermore, a solution comprising a substitution of materials at the extreme tip of the blade to better withstand the high temperatures is not workable at this time since no known reasonably priced metallic material or means for reliable attachment can withstand the temperatures of current advanced technology engines without supplemental cooling.

The present invention provides a solution to these problems with the prior art by the provision of a multiplicity of generally radial passages formed within the radial extremities of the side walls communicating with the blade internal coolant cavity to provide cooling thereof.

SUMMARY OF THE INVENTION

It is, therefore, the primary object of the present invention to provide enhanced cooling of the radial extremities of the side walls of a turbomachinery rotor blade having a recessed tip cap and a cooled internal cavity.

This, and other objects and advantages, will be more clearly understood from the following detailed description, the drawing and specific examples, all of which are intended to be typical of rather than in any way limiting to the scope of the present invention.

Briefly stated, the above object is accomplished by providing the radial extremities of the blade side walls with a plurality of spaced external parallel slots extending radially from approximately the tip cap to the blade tip end. A thin sheet metal sleeve is inserted around the blade perimeter and over the ribs between adjacent slots to form therewith a multiplicity to open-ended channels. The sleeve and blade tip ribs are then united as by brazing. In one embodiment there is provided a groove beneath the sleeve which serves as a fluid plenum extending circumferentially about the blade perimeter and intersecting each channel. Passages communicate from the blade internal coolant cavity radially inwardly of the tip cap to the groove so that cooling fluid from the internal cavity will be carried to and distributed by the grooves to the channels which carry the coolant to the extreme blade tip to effect cooling thereof.

DESCRIPTION OF THE DRAWING

While the specification concludes with claims particularly pointing out and distinctly claiming the subject matter which is regarded as part of the present invention, it is believed that the invention will be more fully understood from the following description of the preferred embodiment which is given by way of example with the accompanying drawing in which:

DESCRIPTION OF THE PREFERRED EMBODIMENT

Figure 1:
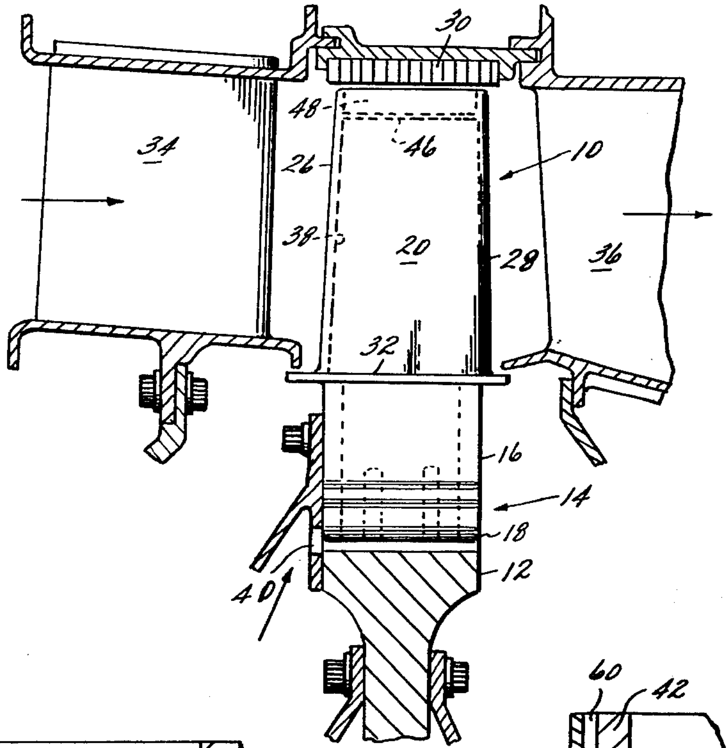
FIG. 1 is a cross-sectional view of a portion of a gas turbine engine incorporating a blade cooled according to the present invention.

Referring to the drawings wherein like numerals correspond to like elements throughout, attention is first directed to FIG. 1 wherein a turbomachinery rotor blade designated generally at 10 and constructed according to the present invention is illustrated. The blade cooperates with a rotatable disk 12 by means of a dovetail connection 14 between the blade root 16 and a slot 18 in the disk. The blade includes an airfoil 20 which, as may be seen in FIGS. 2 and 3, incorporates a pair of spaced radially extending side walls 22 and 24. Side wall 22 is convex in profile and is generally referred to as the blade suction surface whereas side wall 24 is concave in profile and is generally referred to as the blade pressure surface. The blade has a leading edge 26 and a trailing edge 28.

The blade pictured in FIG. 1 is utilized in the turbine of a turbomachine such as a gas turbine engine and as such extracts kinetic energy from a rapidly moving and high temperature flow of working fluid passing in the direction of the arrows illustrated. The flow path for this operating fluid is defined between an encircling shroud 30 and a platform 32 carried by the blade and disposed between the airfoil 20 and blade root 16. To enhance operating of the turbine, airfoil-shaped stators 34 and 36 are disposed to the upstream and downstream side, respectively, of blade 10. As is well understood in the art, these stators serve to orient the airflow with respect to the rotating blade 10. Furthermore, it is to be understood that the rotor and stator blades comprise annular arrays of blades disposed about the centerline of the engine, but only an individual blade or stator form each stage is depicted herein for simplicity.

In operation, the turbomachine comprising the elements of FIG. 1 operates in a manner well known in the art. In essence, a high energy fuel is combusted with compressed air in an upstream combustor (not shown) and directed sequentially through stator 34, blade 10, and stator 36. Kinetic energy extracted from the fluid by airfoil 20 is utilized to turn a shaft (not shown) to which disk 12 is attached for the purpose of operating an air compressor and other mechanical portions of the engine.

As stated, blade 10 is formed in an airfoil shape and includes side walls 22 and 24. The blade also incorporates an internal cavity 38 (in FIG. 3) into which cooling air is routed via an aperture 40 associated with the blade root 16. The radial extremity of side walls 22 and 24 are designated 42 and 44, respectively. Between these extremities, the blade is open ended absent a tip cap 46 which may be of the improved varieties taught in U.S. Pat. No. 3,854,842, issued to Corbett D. Caudill, or U.S. Pat. No. 4,010,531, issued to Richard H. Andersen et al., which are assigned to the assignee of the present invention. This open-ended area is designated generally 48. Thus, the tip cap recessed within open end 48 partially seals the internal coolant cavity 38 from the blade environment. Furthermore, the side wall radial extremities 42 and 44 form a labyrinth seal for inhibiting leakage of the operating fluid between the airfoil 20 and the circumscribing shroud 30. In the manner of the prior art, one or more apertures 50 (see, for example, FIG. 6) may be provided to pass a predetermined amount of cooling air from the internal blade cavity 38 into the open-ended area 48 to provide cooling thereof. However, in advanced-technology, high-temperature turbines an inordinately high amount of cooling air would have to be injected into tip space 48 in order to provide effective cooling of the side wall extremities 42 and 44. The present invention deals particularly with the cooling of these side wall extremities.

Figure 3:
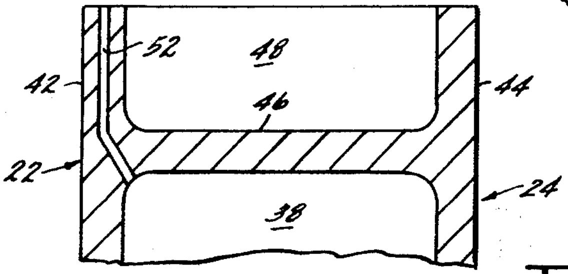
FIG. 3 is an enlarged cross-sectional view of the tip end of a turbine blade fabricated according to the present invention.

Referring now to FIG. 3 wherein the present invention is shown in its simplest form, and in accordance with the object of the present invention, means are provided for routing a portion of the coolant from internal cavity 38 and through side wall extremities 42 and 44 to provide convective cooling thereof. In the example of FIG. 3, these means comprise a multiplicity of generally radial channels 52 which route cooling air from the internal coolant cavity 38, around the tip cap 46 and thereafter discharge it out of the open end of each channel at the radial tip of the side walls. Such channels may be formed by casting or drilling and the number of holes is dependent upon the amount of cooling air required, the temperature of the coolant within cavity 38 and other factors normally considered in sound thermodynamic practices. This supposed solution is effective in that it employs convection cooling and utilizes only small amounts of cooling airflow, thereby minimizing the performance penalty on the overall propulsive cycle. The resulting lower temperature of the extremities 42 and 44 enhances their structural life.

Figure 4:
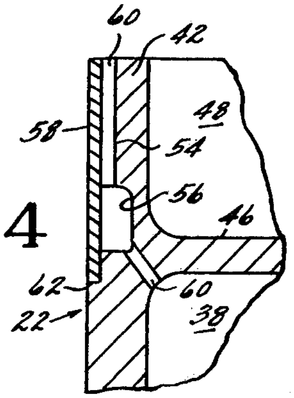
FIG. 4 is a partial cross-sectional view, similar to FIG. 3 and taken along line 4—4 of FIG. 2, depicting an alternative embodiment of the present invention.
Figure 2:
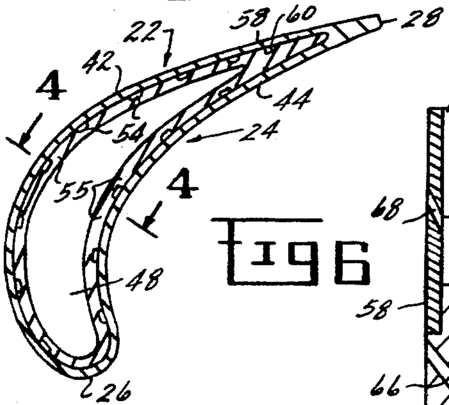
FIG. 2 is an end view of a turbine blade fabricated in accordance with the present invention and particularly illustrating the cooling of the tip thereof.

However, it is recognized that in some turbine blade applications it will be extremely difficult, if not impossible, to form cooling channels 52 by conventional drilling or casting techniques. Hence, additional techniques are provided, consistent with the object of the present invention, in the alternative embodiments depicted in FIGS. 2, 4, 5 and 6. Referring first to FIGS. 2 and 4, the radical extremities 42 and 44 have provided, on the external surfaces thereof, a plurality of spaced external parallel slots 54 extending generally radially from approximately the vicinity of the tip cap 46 to the tip end of the blade. The blade material between adjacent slots 54 comprises a plurality of generally radially extending ribs 55. A groove 56 extends circumferentially about the blade and intersects each of the fluid slots 54, thereby separating the slot 54 into two portions, one of which extends from fluid cavity 38 to groove 56 and the second portion of which extends from groove 56 to the tip of the blade. Slots 54 and groove 56 may be formed by casting, drilling, etching, or chemical milling, or a combination of the above, as may be well appreciated by those familiar with this art.

Surrounding the blade tip is a thin sheet metal sleeve 58. The outer faces of the ribs 55 are bonded to the sheet metal sleeve 58 as by brazing or welding and cooperate to form with slots 54 a multiplicity of slightly different cooling channels about the perimeter of the blade tip, the channels now being designated 60. Cooling air from cavity 38 is thus fed into groove 56 which serves as a plenum to further distribute the coolant through radially extending passages 60. The coolant washes inside the outer face of the side wall extensions 42 and 44, and the internal surface of sheet metal sleeve 58, to carry heat therefrom at a steady rate. The heated coolant is subsequently ejected into the motive fluid stream through the tip of the blade.

Figure 5:
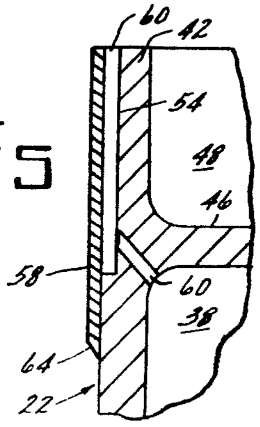
FIGS. 5 and 6 are partial cross-sectional views, similar to FIG. 4, depicting other alternative embodiments of the present invention.

In its preferred embodiment, sleeve 58 would be disposed within a recessed portion 62 (FIG. 4) such that its outer surface would be flush with the blade side walls 22 and 24 so as to avoid radial discontinuities that could lead to aerodynamic inefficiencies. However, where sleeve 58 was thin enough and the performance penalties could be accepted, the sleeve could be wrapped about the blade side walls 22 and 24 and brazed or welded thereto as shown in the embodiment of FIG. 5. Therein, the sleeve is not recessed and, in fact, a step 64, which could be minimized as by chamfering or blending, exists at its juncture with airfoil side wall 22. Note also that in the embodiment of FIG. 5 groove 56 has been eliminated, since this groove is not an essential part of the present inventive concept and may not be necessary in some applications.

Figure 6:
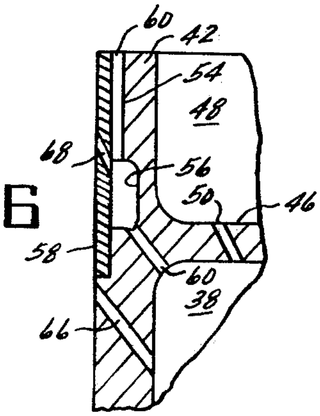

A fourth and final form of the present invention is illustrated in FIG. 6. As is well known by those experienced in turbine cooling design, one of the more effective and fundamental cooling principles is that of film cooling whereby a sheet of relatively cool air is permitted to flow over an airfoil as a film, thereby providing a protective barrier between the airfoil and the hot gas environment. To that end, the cooling concept of FIG. 4 has been modified slightly in FIG. 6 to enhance cooling of the blade tip by the film cooling principle. A plurality of slanted holes 66 is formed in side walls 22 and 24 to direct a portion of the coolant from internal cavity 38 toward the blade tip and as a coolant film over side wall extremities 42 and 44. Additional film cooling can be provided by adding further rows of slots as, for example, a row of slanted slots 68 through sheet metal sleeve 58 which serve to direct a flow of coolant from groove 56 as a film over sleeve 58. Of course, the number and size of the film cooling slots will be dictated by the degree of supplemental cooling required.

As a result of the various embodiments of the present invention, substantial improvement to the tip cooling of a turbomachinery rotor blade has been provided with respect to that of the prior art rotor blade cooling concepts. The present invention permits the selective cooling of the extreme portion of a turbomachinery rotor blade without the necessity of dumping large amounts of cooling air into the open end 48 above tip cap 46. Additionally, the present inventive concept utilizes as a source for the coolant the readily available supply thereof present in the blade internal cavity and does not necessitate the drilling of extremely long cooling holes through the entire radial length of the side walls 22 and 24 from the initial collant source near the blade root 16 to the extreme blade tip as has characterized some of the prior art cooling schemes. In addition, the present invention enables the extreme tip section to be cooled effectively by means of advantageously low quantities of cooling air.

It will be obvious to one skilled in the art that certain changes can be made to the above-described invention without departing from the broad inventive concepts thereof. For example, it may become advantageous in the embodiments of FIGS. 4-6 to form the cooling slots or channels into the inner perimeter of sheet metal sleeve 58 rather than the external perimeter of side wall extensions 42 and 44. Furthermore, a full circumferential band may be neither required nor desired in some instances. And, a different number of channels may be desired from the fluid cavity 38 to groove 56, and from groove 56 to the blade tip. It is intended that the appended claims cover these and all other variations in the present invention's broader inventive concepts.

Having thus described the invention, what is considered novel and desired to be secured by Letters Patent of the United States is set forth in the appendant claims.

I claim:

1. A turbomachinery blade having spaced radially extending side walls defining an open radially outward end, a tip cap within the open end and cooperating with the side walls to define therewith an internal coolant cavity, the radial extremities of the side walls extending outwardly of the tip cap and means for routing coolant from said internal cavity around the tip cap and through the side wall extremities to provide convective cooling thereof, said routing means comprising a multiplicity of alternating slots and ribs about the perimeter of the side wall extremities, said slots extending from the blade tip to the internal cavity, and a sleeve wrapped about the side wall extremities and defining in cooperation with the ribs and slots a multiplicity of generally radially extending open-ended channels.

2. The turbomachinery blade as recited in claim 1 wherein said slots and ribs are formed on the outer perimeter of the side wall extremities.

3. The turbomachinery blade as recited in claim 1 wherein said slots and ribs are formed on the inner perimeter of the sleeve.

4. The turbomachinery blade as recited in claim 1 further comprising a plenum groove about the blade perimeter and intersecting each of said channels.

5. The turbomachinery blade as recited in claim 1 wherein said sleeve is disposed within a recess about the side wall extremities such that the sleeve is substantially flush with the remainder of the blade side walls.

6. The turbomachinery blade as recited in claim 4 further comprising a plurality of radially slanted holes through the side walls from the plenum groove for spreading coolant therefrom as a film over the side wall extremities.

* * * * *